Dec. 2, 1924.

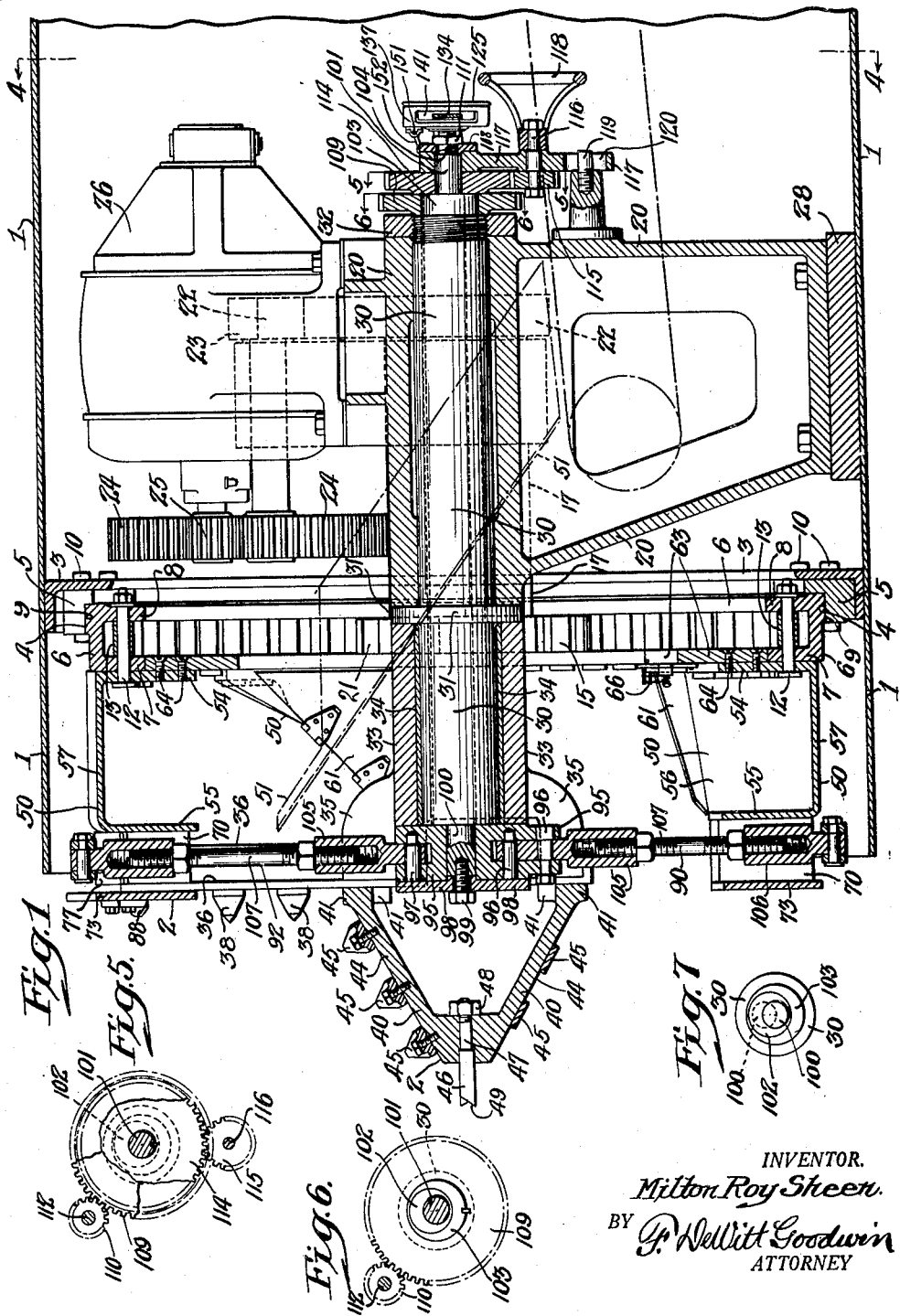

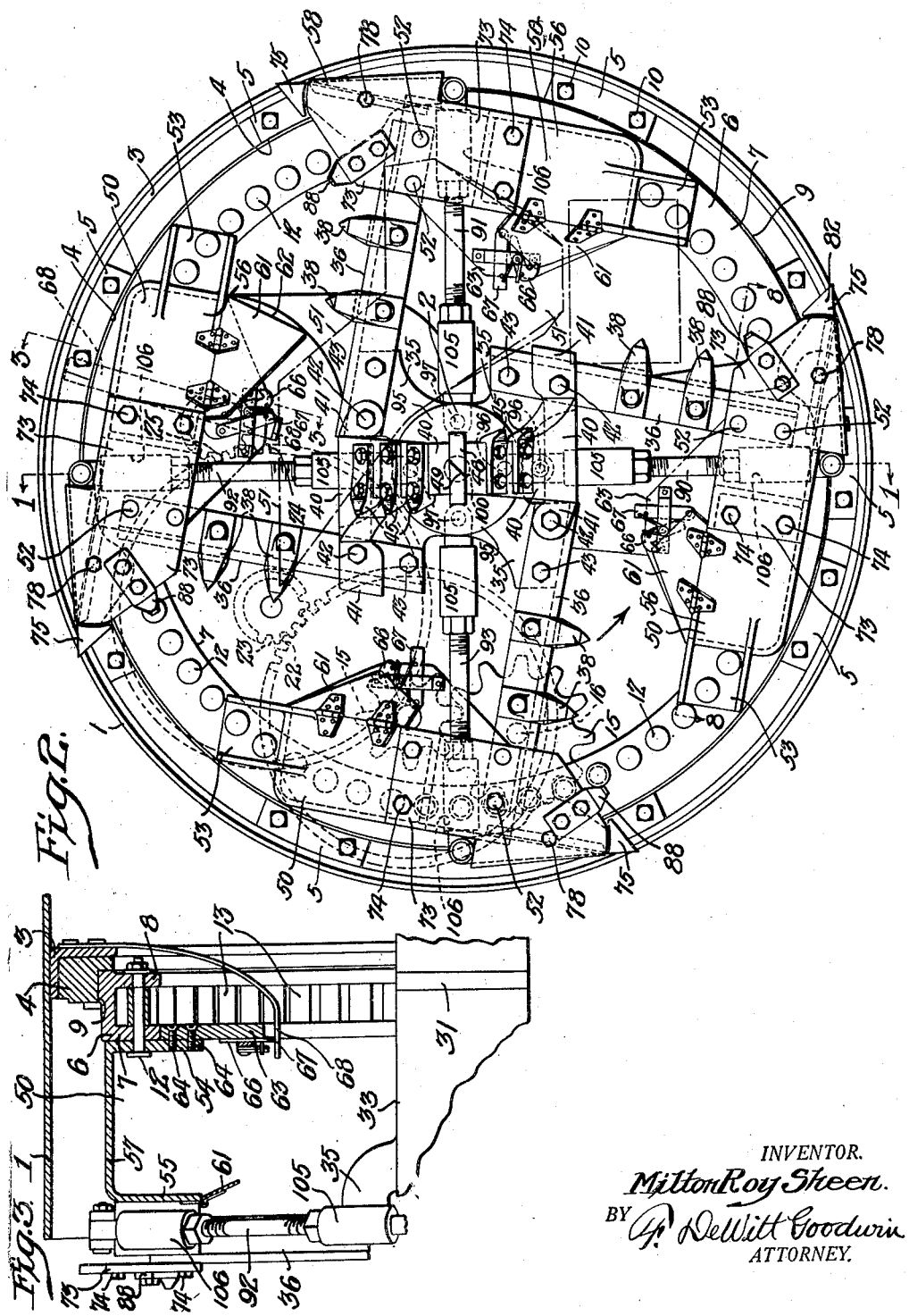

M. R. SHEEN 1,517,802

TUNNELING MACHINE

Filed May 14, 1921    5 Sheets-Sheet 3

INVENTOR.
Milton Roy Sheen.
BY DeWitt Goodwin
ATTORNEY.

Dec. 2, 1924.
M. R. SHEEN
TUNNELING MACHINE
Filed May 14, 1921     5 Sheets-Sheet 4
1,517,802
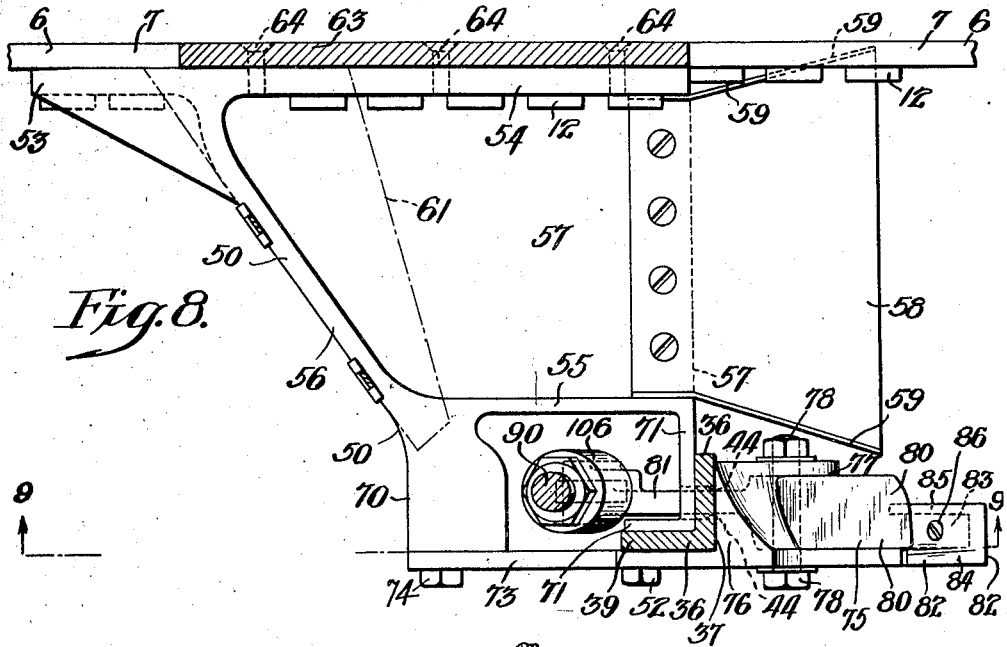
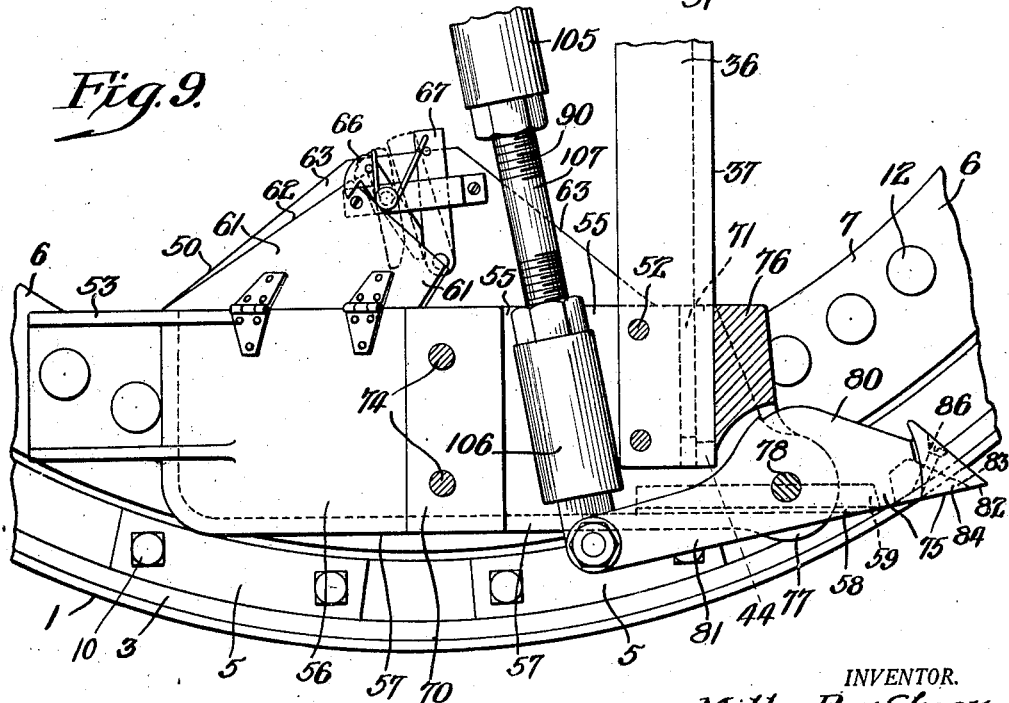
INVENTOR.
Milton Roy Sheen.
BY DeWitt Goodwin
ATTORNEY.

Dec. 2, 1924.
M. R. SHEEN
TUNNELING MACHINE
Filed May 14, 1921  5 Sheets-Sheet 5
1,517,802
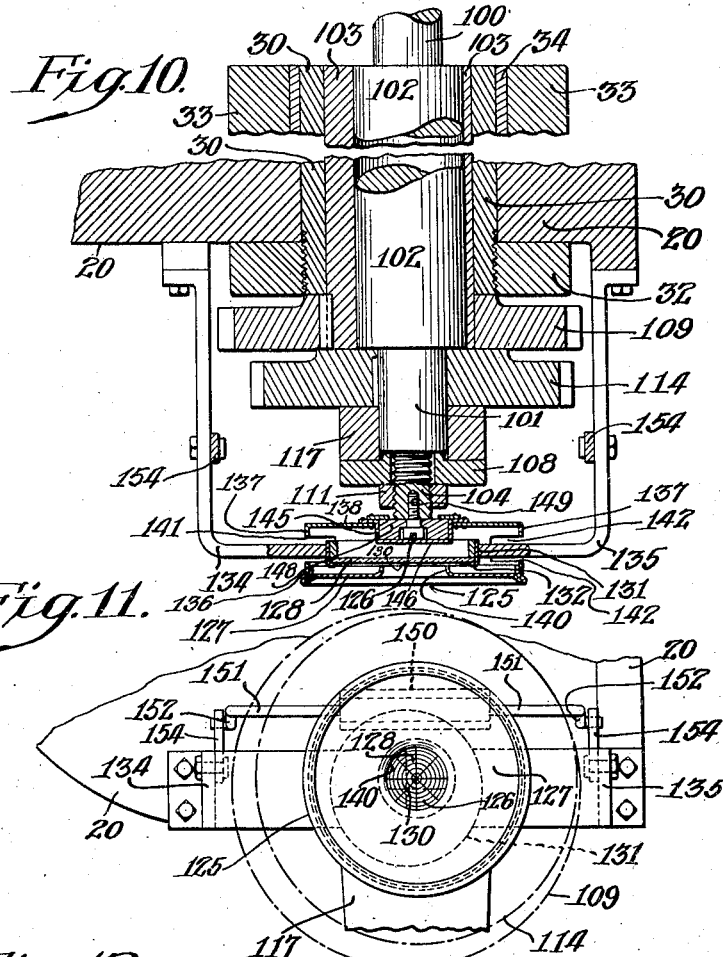
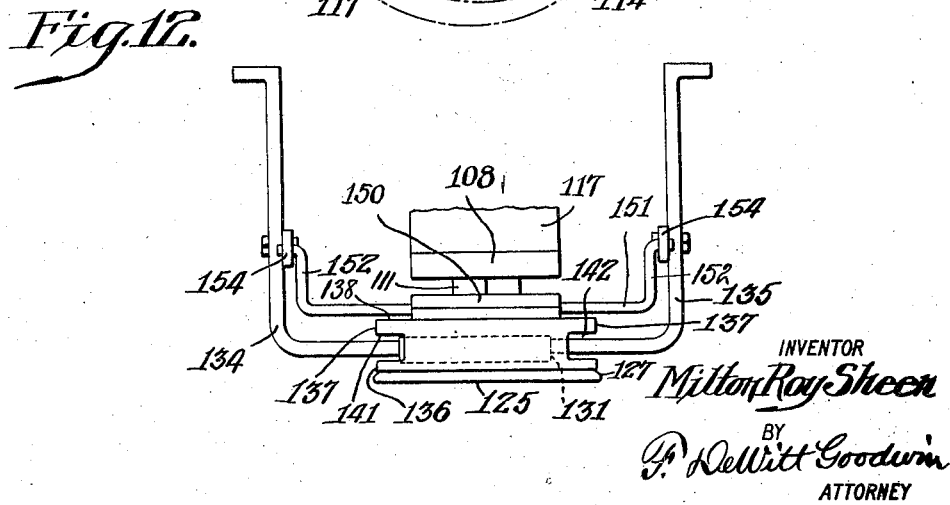
INVENTOR
Milton Roy Sheen
BY
P. DeWitt Goodwin
ATTORNEY Patented Dec. 2, 1924.

1,517,802

UNITED STATES PATENT OFFICE.

MILTON ROY SHEEN, OF PHILADELPHIA, PENNSYLVANIA, ASSIGNOR TO TUNNEL MACHINE MANUFACTURING AND ENGINEERING COMPANY, OF PHILADELPHIA, PENNSYLVANIA, A CORPORATION OF DELAWARE.

TUNNELING MACHINE.

Application filed May 14, 1921. Serial No. 469,511.

*To all whom it may concern:*

Be it known that I, MILTON ROY SHEEN, a citizen of the United States, residing at Philadelphia, in the county of Philadelphia and State of Pennsylvania, have invented certain new and useful Improvements in Tunneling Machines, of which the following is a specification.

My invention relates to improvements in a machine for forming tunnels, sewers and the like. My invention also relates to further improvements in a machine for building sewers for which Letters Patent of the United States, No. 1,351,137, were issued to me on the 31st day of August, 1920.

The object of my invention is to provide a machine having a novel form of rotary cutter head which is located at the forward end of a cylindrical casing, within which casing is contained the operating means for rotating the cutter head to form an excavation through which the casing may be advanced; a further object of my invention is to provide adjustable cutters upon the cutter head which may be extended or retracted during the rotation of the cutter head whereby the excavation may be enlarged at one portion of the arc of its circumference and reduced at a diametrically opposite arc, whereby the general direction of travel of the machine may be governed and the machine thus steered to form a tunnel or sewer having either a straight or circuitous course as required; a further object of my invention is to provide means for varying the radial points, in the circle of rotation of the cutter head, at which the eccentricity of the adjustable cutters will take place so that the excess cutting or excavating may be directed to any desired radial point in the circumference of the excavation; a further object of my invention is to provide an indicator which will show a correct reading of the amount of eccentric throw which is given to the adjustable cutters of the cutting head, and also the radial points, in the circumference of the excavation, at which the increased and reduced cutting is taking place; a still further object of my invention is to provide means for shifting the position of the adjustable cutters durng the rotation of the cutter head; a still further object of my invention is to mount buckets upon the cutting head for lifting the dirt as it is loosened by the cutter head and depositing the dirt into a hopper from which it is dropped upon a conveyor belt. These together with various other novel features of construction and arrangement of the parts, which will be more fully hereinafter described and claimed, constitute my invention.

Referring to the accompanying drawings:

Fig. 1 is a vertical longitudinal sectional view of the forward end of a machine for building tunnels, showing my invention embodied therein;

Fig. 2 is an end elevation of the forward end of the machine, as shown in Fig. 1;

Fig. 3 is a partial vertical longitudinal section on line 3—3, Fig. 2, showing the arm for releasing the lid of the buckets.

Fig. 5 is a transverse section on line 5—5, Fig. 1, showing the gear wheels for turning the eccentric shaft and also the eccentric sleeve surrounding said shaft;

Fig. 6 is a transverse section on line 6—6, Fig. 1, showing only the gear wheels for turning the eccentric sleeve;

Fig. 7 is an end view of the eccentric shaft, the eccentric sleeve and the bearing sleeve;

Fig. 8 is a horizontal section on line 8—8, Fig. 2, showing one of the adjustable cutter heads and a bucket;

Fig. 9 is a vertical section on line 9—9, Fig. 8;

Fig. 10 is an enlarged horizontal central section, showing the front and rear ends of the main bearing, shaft and sleeves and also the indicator;

Fig. 11 is an end elevation of Fig. 10;

Fig. 12 is a plan view of Fig. 11, showing the indicator; and

Figure 13:
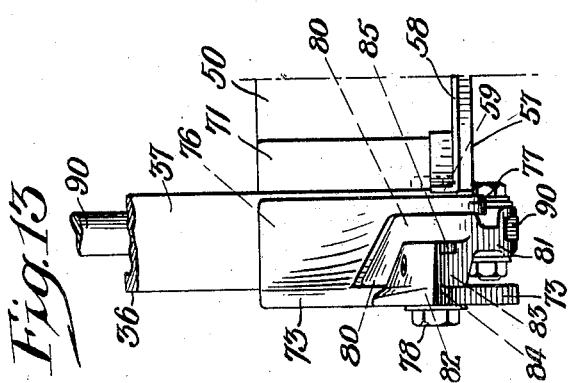

Fig. 13, (Sheet 3), is a side elevation of the rocker arm and the adjustable cutter as shown in Figs. 8 and 9.

In the accompanying drawings in which like reference characters refer to like parts, 1 represents a cylindrical casing, which is approximately the same diameter as the tunnel or sewer which is to be built at the rear end of the casing. The casing is provided with a cutter head 2 for making an excavation which will permit the casing to be advanced through the excavation as the latter is formed.

Within the casing is secured an annular flange 3 which forms an annular bearing 4 in which is rotatably mounted a ring-gear 6. The ring-gear forms part of the cutter head 2 and rotates the latter. Said ring-gear is of channel formation in cross section and consists of the side flanges 7 and 8 and the periphery 9, which latter forms the annular bearing face which rotates upon the annular bearing surfaces 4, which latter may be formed of segmental blocks 5 which are secured by bolts 10 to the annular flange 3 secured to the casing 1.

The side flanges 7 and 8, of the ring-gear 6, carry pins or bolts 12 provided with sleeves or bushings 13. Said sleeves or bushings form the teeth or the ring-gear 6 and are engaged by a pinion 15. The bolts 12 may be readily removed to replace the bushings 13 when worn.

Figure 4:
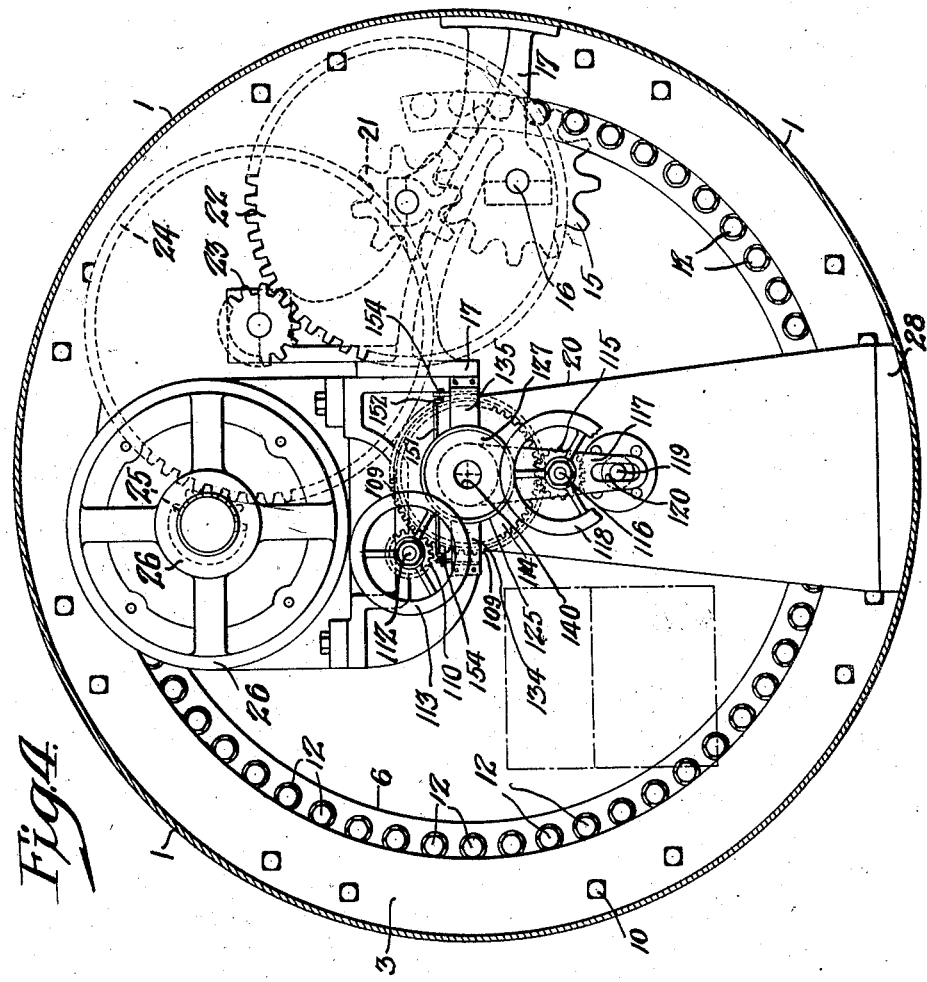
Fig. 4 is a transverse section on line 4—4, Fig. 1.

The pinion 15 is secured on a shaft 16, mounted in a bracket 17, shown in Fig. 4, secured between the central bearing 20 and the casing 1. The pinion 15 is rotated by means of gear wheels 21, 22, 23, 24 and 25 driven by a motor 26, mounted upon the main bearing 20. Said gear-wheels are designed to greatly reduce the speed so as to slowly rotate the ring-gear 6.

The main bearing 20 is mounted upon a bed-plate 28 secured to the lower portion of the casing 1. A bearing sleeve 30 in the form of a hollow shaft is rigidly secured in the main bearing 20 and is concentrically positioned in relation to the casing 1. The bearing sleeve or hollow shaft 30 is provided with a collar or flange 31, located near the middle of its length. Said collar 31 is clamped against the forward face of the main bearing 20 by means of a nut 32 threaded upon the rear end of the bearing sleeve 30. The nut 32 clamps against the rear face of the main bearing 20 and holds the bearing sleeve 30 in a fixed position in relation to the main bearing 20 and in relation to the casing 1.

The portion of the bearing sleeve 30 projecting forwardly from the main bearing 20 forms a stud-shaft upon which is rotatably mounted the hub 33 of the cutter head 2. 34 represents a bushing interposed between said parts.

The hub 33 of the cutter head 2 is provided with four arms 35. To each of the arms is rigidly bolted a spoke 36 made in the form of an angle-plate, and having detachably secured thereto cutters 38.

A V-shaped bracket or frame 40, shown in Figs. 1 and 2, is bolted to the arms 35 of the hub 33. Said frame 40 has lugs or feet 41 which are placed against the angle-plates forming the spokes 36 and the bolts 42 pass through the lugs 41 of the frame and also through one face of the angle-plate 36 and thus hold the frame 40 to the arms 35. The spokes 36 are further held rigidly upon said arms 35 by the bolts 43.

The V-shaped frame 40 carries cutters 45 which are secured upon the oppositely inclined faces 44 of the frame 40 and upon the apex of the frame 40 is secured a flat plate 46 forming a boring bit which is located in alignment with the center of rotation of the cutter head 2. The base of the plate 46 is set into a slot formed across the face of the frame and said plate 46 is provided with a bolt 47 extending through the end of the frame 40 and secured by a nut 48 on the inner end of the bolt. The plate 46 is provided with cutting edges 49 upon the outer edge thereof.

Buckets 50 are provided upon and rotate with the cutter head 2 and scoop up the dirt as it is loosened by the cutter head and dump it into a hopper 51 which is shown in dotted lines in Figs. 1 and 2. Said hopper projects rearwardly through the ring-gear 6 and thus prevents the ring-gear from being formed with radial spokes for connecting it directly with the hub 33 of the cutter head.

Each of the buckets 50 is rigidly secured between the outer end of a spoke 36 and the flange 7 of the ring-gear 6. Bolts 52 secure the bucket and the spoke together and the bolts 12 of the ring-gear rigidly secure the bucket to the ring-gear, as more clearly shown in Figs. 8 and 9. Said bucket 50 is provided with an extension bracket 53 forming an extra flange for bolting the bucket to the ring-gear flange 7.

The bucket 50 consists of the rear wall 54, the front wall 55, a side wall 56 extending at an oblique angle with and connecting the rear and front walls, and a bottom wall 57. Upon the bottom wall 57, at the open side of the bucket is detachably secured an extension plate 58, having flaring sides with turned up edges 59. The forward edge of the extension plate 58 extends nearly to the line of the outer circumference of the casing and scoops up the dirt and directs it into the bucket as the cutter head rotates carrying with it the buckets.

A lid 61 is hinged to the wall 56 of the bucket and when closed, as shown in Fig. 9, stands at an oblique angle with the bottom wall 57 of the bucket, thus increasing the size of the bucket. The rear edge 62 of the lid bears against the vertical surface of an extension side plate 63, which is bolted to the rear surface of the rear wall 54 of the bucket 50. Said rear wall 54 extends above the flange 7 of the ring-gear 6 and affords room for the said extension side plate to be secured by bolts 64 to the bucket.

A latch 66, for holding the lid 61 in the closed position, is pivoted upon the extension side plate 63. A releasing lever 67 is also pivoted upon the side plate 63. Said releasing lever 67 strikes an arm 68 shown in Figs. 2 and 3, when the bucket reaches the upper portion of the casing. Said arm 68 is secured to the casing and is positioned in the path of the releasing lever 67 and trips the latch 66, so that the lid 61 will fall open when the bucket is in the inverted position above the hopper 51.

The forward wall 55 of the bucket 50 is provided with bearing ribs 70 and 71, see Figs. 8 and 9. Said rib 71 forms a means for rigidly securing the angle-plate forming the spoke 36 to the bucket 50 by the bolts 52. The bearing ribs 70 and 71 carry a bearing plate 73, on which is pivotally mounted the adjustable cutter 75. Bolts 74 secure the bearing plate 73 to the rib 70 of the bucket. The bolts 52 pass through the bearing plate 73, also through the angle-plate of the spoke 36 and said bolts are tapped into the rib 71 of the bucket 50, thus holding said parts rigidly together.

The bearing plate 73 is provided with an enlarged boss 76, forming a right-angle corner or shoulder which fits against the angle-plate forming the spoke 36. The boss 76 has an extension lip 77 forming a bearing for a pivot bolt 78 which also passes through the bearing plate 73 and forms a shaft on which is loosely mounted a rocker arm 80, of the adjustable cutter 75, which arm 80 occupies the space between the lip 77 on the boss 76 and the bearing plate 73 and is free to rock in the space formed below the boss 76. The member 37 of the angle-plate forming the spoke 36 has a vertical slot 44 formed therein for the free movement of the member 81 of the rocker arm 80.

The rocker arm 80 is provided with a detachable cutting blade 82, which is secured to the reduced tongue 83 extending from the rocker arm 80. Said cutting point 82 is provided with cheek pieces 84 and 85, which embrace the sides of the tongue 83, and a bolt 86 passes through the cutting blade 82 and extends into the tongue 83 for holding the cutting blade rigidly upon the rocker arm.

The boss 76 is curved or beveled rearwardly, and the arm 80 and the cutting blade 82 are also beveled rearwardly, so as to throw the dirt as it is loosened by the cutting blade 82 towards the bucket upon the arm 36 positioned immediately in the rear of the cutting blade and the arm carrying the latter.

The bearing plate 73 carries a cutter blade 88, which is secured thereon by bolts, shown in Figs. 1 and 2, but omitted from Fig. 7. This cutter blade 88 is positioned so as to travel in a circle between the adjustable cutter 75 and the fixed cutting blades 38 on the spokes 36.

The rocker arms 80 forming the adjustable cutters are pivotally connected with connecting rods 90, 91, 92 and 93 which in turn are connected with a disk 95. One connecting rod 90 is rigidly connected with the disk 95 by two bolts or pins 96. The other connecting rods are pivotally connected with the disk 95 by the pivot pins or bolts 97.

The disk 95 is loosely mounted upon a stud shaft 100, which forms part of a larger shaft 102 and said stud shaft 100 is positioned eccentrically upon said shaft 102. The shaft 102 is in turn eccentrically mounted in a sleeve 103, which is rotatably mounted in the fixed bearing sleeve 30.

The shaft 102 carrying the eccentrically mounted stud shaft 100 and the sleeve 103 in which said shaft 102 is eccentrically mounted may be rotated in the fixed bearing sleeve 30, independently of each other, by mechanism located at the rear end of the main bearing, which will be more fully hereinafter described.

The disk 95 is retained upon the stud shaft 100 by a plate 98 secured to the end of the stud shaft 100 by a bolt 99.

The shaft 102 and the sleeve 103 may be rotated so as to bring the stud shaft 100 on the center line of the casing 1, hereinafter referred to as the true center. The stud shaft 100 is shown in dotted lines in Fig. 2 positioned on the true center in relation to the casing. When the parts are in the position shown in Fig. 2, the disk 95 will rotate on the stud shaft 100 and no eccentric motion will be imparted to the disk 95 and therefore all the adjustable cutters 75 will revolve around the true center and will thus cut a cylindrical excavation in alignment with the casing 1.

It will be understood that when the ring-gear 6 is rotated by the motor 26 the buckets 50 and all the cutters will revolve with the ring-gear. The hub 33 is loosely mounted upon the fixed concentric bearing sleeve 30, and the hub 33 turns with the ring-gear 6. The hub 33 is rigidly connected with the buckets 50, through the arms 35 and the spokes 36, thus carrying the weight of the buckets 50 and causing the buckets to rotate around the true center of the machine.

The adjustable cutters 75 are mounted on the rocker arms 80, which are pivotally mounted on the pins 78, secured upon the buckets or the spokes 36, as above described. Each connecting rod 90, 91, 92 and 93 comprises sleeves 105 and 106 into which is secured a shaft 107 having right and left handed screw-threads and lock-nuts, by means of which the length of a connecting rod may be varied so that the rocker arms 80 can be set in any desired position and thus regulate the diameter of the excavation which the cutting points 82 of the adjustable cutter 75 will make as the cutting head is rotated.

The disk 95 will rotate upon the stud shaft 100 when the cutter head rotates, because one of the connecting rods is rigidly connected with said disk. The connecting rod 90, as above stated, is secured to the disk by two pins or bolts 96, thus forming a rigid connection. The disk will control the position of all the rocker arms and they will not have any rocking motion imparted to them as long as the stud shaft 100 is positioned on the true center.

For the purpose of steering the machine as it is advanced through the ground, the stud shaft 100 is thrown off the true center and the disk 95 will then turn around an eccentric pivot point and the connecting rods will move the rocker arms 80 and thereby throw the cutting point 82 thereon further away from the true center of the machine and thus make a deeper cut in the earth at one portion of the circle of rotation and also cause the rocker arm in the diametrically opposite position to draw the cutter point 82 thereon closer to the true center of the machine.

The shaft 102, on which the stud shaft 100, is carrying the disk 95, is eccentrically mounted, together with the sleeve 103 in which said shaft 102 is mounted, form a double eccentric by which two results are obtained; one of which is the variation in the distance which the stud-shaft 100 may be moved from the true center and the depth of the eccentric cutting effect of the adjustable cutters thus regulated; the other result is the radial position at which the eccentric cutting effect of the adjustable cutters 82 will occur in the circle of rotation of the cutting head, whereby the direction of travel of the machine may be changed and the line of direction of the tunnel may be given an elevation or declination in relation to a horizontal plane or the direction may be veered to the right or left, or towards any intermediate radial angle.

The position of the stud-shaft 100 and the eccentric cutting effect of the adjustable cutter, may be controlled or regulated by the following mechanism: The sleeve 103 extends through the bearing-sleeve 30 (see Figs. 1, 5, 6 and 10) and projects a sufficient distance beyond the rear end of sleeve 30 to permit a gear-wheel 109 to be keyed, or otherwise secured, to said sleeve 103. A pinion 110 meshes with the gear-wheel 109. Said pinion 110 is secured on a shaft 112 mounted in bearings formed upon the main bearing 20. Upon the shaft 112 is secured a hand-wheel 113 (shown in Fig. 4), by which the sleeve 103 may be rotated through the medium of the pinion 112 and the gear-wheel 109.

The shaft 102 is provided, upon its rear end, with a pin or stud shaft 101, which is positioned eccentrically upon the shaft 102 and also in longitudinal alignment with the stud-shaft 100 upon the forward end of shaft 102. A gear-wheel 114 is keyed, or otherwise secured, upon the pin 101, and meshes with a pinion 115 secured upon a shaft 116, rotatably mounted in a bearing arm 117. Said shaft 116 has a hand-wheel 118 thereon for turning the pin 101 and the shaft 102, through the medium of the said pinion 115 and the gear-wheel 114.

The bearing arm 117 is loosely mounted at one end thereof upon the stud pin 101 and its opposite end is guided upon a pin 119 secured in a fixed position upon the main bearing 20. The arm 117 is provided with an elongated slot 120, to receive the guide pin 119, which allows the bearing arm 117 to slide upon said guide pin 119 and permits the opposite end of the bearing arm 117 to follow the eccentrically mounted pin 101 and always maintain a uniform distance between the centers of the gear-wheel 114 and the pinion 115 so that they will always remain in mesh with each other.

The arm 117 is retained upon the stud pin 101 by a retaining washer 108 secured by a nut 111 on the reduced threaded shank 104 of the stud pin 101.

The stud shaft 100 on which the disk 95 is mounted does not have any movement except when its position is being changed by means of the hand wheels 113 and 118. As above stated, the stud shaft 100 forms a center or bearing around which the disk 95 rotates freely by the rotary motion imparted by the cutter head.

Figs. 5, 6 and 7 show the shaft 102 carrying the stud shafts 100 and 101 diagrammatically, and in which views the stud shafts are on the true center in relation to the fixed bearing sleeve 30 and to the casing 1. The adjustable cutters 75 will thus rotate around the true center of the machine and the rocker arms 80 will not rotate or rock on their pivot shafts 78 on which they are mounted.

By turning the hand wheel 118, a rotary motion will be imparted to the shaft 102, through the pinion 115 and the gear-wheel 114, and said shaft 102 may be thus rotated within the sleeve 103 to bring the stud shaft 100 into the position shown in dotted lines Fig. 7, which position is the greatest distance the stud-shaft may be moved away from the true center. When in the dotted position, shown in Fig. 7, the stud shaft 100 will form an eccentric center around which the disk 95 rotates. When said eccentric center is positioned directly above the true center, the disk 95 and the connecting rods will cause a rocking movement of the rocker arms 80. The effect of the rocking movement of the rocker arms 80 will be to throw the cutting point 82 of each rocker arm 80 further away from the true center of the machine, as said rocker-arms successively pass through the arc, of the circle of rotation of the cutter head, which is diametrically opposite to the eccentric position of the stud-shaft 100 in relation to the true center of the machine. Thus when the stud shaft 100 is turned to the dotted position shown in Fig. 7, with said stud shaft directly above the true center of the machine, the rocker arm which is directly below the true center of the machine will throw the cutting point further away from the true center and thus make a deeper cut at this point of the excavation. Simultaneously, the rocker-arm which is directly above the true center of the machine will be given a reverse movement which will draw its cutting point 82 closer to the true center of the machine and said cutting point will not make as deep a cut in the excavation at this point.

When the other two rocker arms are at right angles with the radial line extending through the true center and the eccentrically positioned stud-shaft 100, they will not have any differential movement and the cutting points thereon will be positioned equa-distant from the true center of the machine.

It is necessary to change or control the radial direction of the differential cutting effect of the adjustable cutters or rocker arms carrying the cutting points, so that the direction of travel of the machine may be veered as desired; therefore, the shaft 102 having the eccentric stud-shafts 100 and 101 thereon, is mounted eccentrically in the sleeve 103, so that by rotating the said sleeve 103 the shaft 102 and the stud shafts thereon may be rotated around the true center of the machine without changing the amount of eccentricity of the stud shaft 100 in relation to the true center, but the radial position of the stud-shaft may be thus changed in relation to the true center, by rotating the said sleeve 103, so that the increased cutting effect of the adjustable cutters may be directed to any radial point or arc of the circle of revolution of the cutting head.

The sleeve 103 is rotated within the bearing-sleeve 30, in which it is concentrically mounted by means of the hand wheel 113, the pinion 110 and the gear-wheel 109 as above described.

An indicator 125 is provided for showing the position of the stud-shaft 100 in relation to the true center of the machine. The indicator is located at the rear end of the main bearing 20 in a position accessible to the operator.

The indicator 125 consists of a dial 126 and a face plate 127. The latter having a circular opening 140 formed therein through which the dial may be read. The dial 126 is mounted upon the end of the stud pin 101 at the rear end of the shaft 102. The dial is held against rotating, but is mounted so that it can follow with the eccentric movements of the stud pin 101. A glass plate 128 is secured in a fixed position in front of the dial 126, and upon the glass is a suitable mark 130, indicating the true center of the machine. Said indicating mark is preferably formed by the intersection of horizontal and vertical lines. The indicating mark may be formed by cross wires secured in fixed bearings instead of being carried upon a glass plate.

The glass plate 128 is held in a circular shell 131, having a flange 132 for retaining the glass plate, and a retaining ring 133 which helps to retain the glass against said flange and also holds the shell 131 between the adjacent ends of the arms 134 and 135 which are provided with curved ends conforming with the curvature of the circular shell 131. Said arms are rigidly secured to the main bearing 20 and thus hold the shell 131 and the glass plate in a fixed position.

The indicator casing 136 consists of a cylindrical wall 137, a back plate 138 and a removable face plate 127 with a round opening 140 formed in the center thereof. The shell 131 carrying the glass plate 128 occupies a space within the casing 136 and the cylindrical wall 137 of the casing is provided with large side openings 141 and 142 through which openings the arms 134 and 135 extend into the casing and support the shell 131 and the glass plate entirely free from the casing 136.

The back plate 138 of the casing has a circular box 145 secured in the center thereof and said box extends into the interior of the casing 136 so that the dial plate 146 of said box is positioned adjacent to the glass plate 128. The dial 126 is arranged upon the said dial plate 146 of the box 145 and can be read through the glass plate 128.

Within the box 145 is secured a disk plate 148. Said disk plate is provided with a central aperture through which a bolt 149 extends. Said disk plate is loosely fitted upon the cylindrical portion of the bolt 149 and is retained by the head of the bolt adjacent to the end of the reduced shank 104 of the stud-pin 101. The bolt 149 is positioned concentrically with the stud-pin 101, which latter is positioned eccentrically upon the shaft 102. The disk plate 148 fits loosely upon the bolt 149 so that the bolt may be rotated with the stud pin 101. The disk plate 148 and the casing may be held against rotation upon their own centers, but may be moved bodily in relation to the true center.

The casing 136 is provided with a bearing 150 secured to the back plate 138. The bearing 150 is slidably mounted upon a rod 151 which extends horizontally adjacent to the back plate 138. The rod 151 has end members 152 extending at right angles thereto. Said end members are pivotally mounted in links 154 which in turn are pivotally mounted upon the rigid arms 134 and 135 extending from the main bearing 20. The rod 151 holds the casing 136 in a horizontal position against rotation and permits the casing to be moved by the bolt 149, secured upon the shank 104 of the stud pin 101, when the shaft 102 carrying the stud pin 101 is rotated, and also when the sleeve 103 carrying the shaft 102 is rotated.

The dial plate 146 forming the dial 126 has arranged thereon circular lines and also radial lines. The circles are preferably spaced one-eighth of an inch apart and arranged concentrically in relation to the center of the stud-shafts 100 and 101. The circles will show the distance, in fractions of an inch, between the center of the stud-shafts and the true center of the machine. The radial lines will show the angle or point in the circle of rotation of the cutting head at which the adjustable cutters 75 are thrown further away from the true center of the machine. The radial lines may indicate degrees of the circle or any suitable divisions of the circle.

In actual operation of the indicator the glass plate showing the mark 130 indicating the true center of the machine stands still and the dial 126 and the face plate 127 move in relation to the true center. However, due to the fact that the dial is read through the opening formed in the face plate 127 directly in front of the dial, the effect is that the glass plate showing the true center apparently moves and the dial remains stationary. This is the result desired because it gives a true reading of the position in which the adjustable cutters 75 are actuating.

As above stated each rocker-arm 80 is moved on its pivot shaft 78 by changing the position of the stud-shaft 100 in relation to the true center. The disk 95 which turns upon the stud-shaft 100 acts upon the rocker-arm through a connecting rod attached to the opposite end of the rocker-arm from the cutting point. Therefore the cutting is thrown further from the true center when the rocker-arm is passing through a point in a line extending through the true center and the center of the stud-shaft 100 and when the true center is between the stud-shaft 100 and the rocker-arm. That is to say that due to the fact that the rocker arm gives a reverse movement to the action of the cutting point the stud shaft 100 will have to be moved in the opposite direction to the point in the circle where the greatest cutting is to be effected by the adjustable cutters. Therefore the indicator is constructed to show a true reading of the work being done by the adjustable cutters.

The indicator in Fig. 4, shows the center of the dial coinciding with the mark indicating the true center of the machine. This indicates that the stud-shaft 100 carrying the disk 95 is on the true center, as shown in Fig. 2, and the rocker-arms 80 are not moved on their pivot shafts 78, as the cutter head revolves and an excavation is made by the cutter head which is concentric with the casing 1.

In Fig. 11, the indicator shows that the stud-shaft 100 has been moved away from the true center of the machine. The indicating or reading mark 130, formed by the cross lines on the glass-plate 128, can be read on the dial as indicating the true location, or place, where the eccentric cutting effect is taking place. The reading mark 130 is on the third circle, showing that the adjustable cutters have a throw of three-eighths of an inch off the center and that the additional cutting of the excavation is taking place on a radial line extending, or forming an angle of forty-five degrees below the horizontal center line and forty-five degrees to the left hand side of the vertical center line, looking towards the forward or cutting end of the machine.

By means of the hand wheels 113 and 118 the stud-shaft 100, carrying the disk 95 which controls the movements of the adjustable cutters 75, may be moved into any desired position in relation to the true center of the machine and the indicator will show the position of the stud-shaft 100, because the stud-pin 101 which moves the indicator dial 126 is positioned in alignment with the stud-shaft 100 upon the shaft 102.

By turning the hand-wheel 118 the shaft 102 can be rotated which movement of the shaft 102 will bring the stud-shaft 100 and stud-pin 101 which are eccentrically mounted thereon, either closer to, or further from the true center of the machine. By turning the hand wheel 113 the sleeve 103 can be rotated and as the shaft 102 is eccentrically mounted in said sleeve 103, the radial position of the shaft 102 may be placed at any desired angle, or radial point, in relation to the center of the machine.

The operation of my machine is as follows: The casing, after being placed in the proper position for starting the excavation to form a tunnel, is forced forward, by means not shown in the drawings, so that the cutters on the cutter head 2 will be forced into the ground. The cutter head is rotated by the motor 26 through the gearing which rotates the ring-gear 6, forming part of the revolving cutter head 2, on which the cutters are secured and on which the buckets 50 are carried for lifting the dirt as it is loosened by the cutters and discharging it into a hopper 51 from which it is conveyed to the rear end of the casing.

The cutters and buckets are partially supported by arms extending from the hub 33 which is free to rotate on the concentric bearing sleeve 30, rigidly secured in the main bearing 20. The adjustable cutters 75 which are pivotally mounted upon the rocker arms 80 of the cutter-head may be extended further out from the normal circle of rotation of the cutter-head, at any desired radial point in the rotation of the cutter head and thus increase the cutting effect of the cutting head. The adjustable cutter which is diametrically opposite to the extended cutter will be drawn within the normal circle described by the cutter head. Thus the excavation may be reduced at one portion of the circle and increased at a diametrically opposite portion of the circle of rotation of the cutter head, and the indicator 125 will show the position and the extent of the eccentric cutting, or show that the cutting is taking place concentrically in relation to the casing.

Having thus described my invention, I claim and desire to secure by Letters Patent.

1. A machine of the character described having a cylindrical casing, a bearing concentrically mounted within the casing, cutting mechanism rotatably mounted upon said bearing at the forward end of the casing and mechanism for shifting the center of rotation of the cutting mechanism in relation to the center of the bearing whereby the cutting mechanism will form an excavation eccentric to the casing.

2. A machine of the character described having a cylindrical casing, a bearing concentrically mounted within the casing, a shaft mounted in said bearing, cutting mechanism rotatably mounted upon said shaft at the forward end of the casing, and mechanism for positioning the shaft eccentrically in relation to the bearing whereby the cutting mechanism will form an excavation eccentric to the casing.

3. A machine of the character described having in combination, a bearing, a cutter head rotatably mounted upon said bearing, an arm forming part of the cutter head, cutting blades secured to said arm, a frame located upon the cutter head adjacent to its axis of rotation, a flat plate having a cutting edge thereon, said frame having a slot formed in the forward face thereof extending across the center of the frame to receive the base of the said flat plate, a bolt upon the base of the said plate adapted to extend through the end of the frame, and a nut on said bolt for securing the said plate in the end of the frame.

4. A machine of the character described having in combination, a bearing, a cutter head rotatably mounted upon said bearing, an arm forming part of the cutter head, cutting blades secured to said arm, a frame located upon the cutter head adjacent to its axis of rotation, said frame being of V-shaped formation with its apex upon the center of rotation of the cutter head and its base secured to the latter, a cutting bit detachably secured to said frame adjacent to its apex, and cutting blades secured upon the inclined member of said frame.

5. A machine of the character described having in combination, a cylindrical casing, an annular bearing secured within the casing, a ring gear rotatably mounted upon said annular bearing, said ring gear being of channel formation in cross section, detachable members secured in the gear ring forming gear teeth, a gear wheel for rotating the ring gear, and a cutter head mounted upon the ring gear.

6. A machine of the character described having in combination, a cylindrical casing, an annular bearing secured within the casing, a ring gear rotatably mounted upon said annular bearing, said ring gear being of channel formation in cross section, a cylindrical bearing surface formed upon the periphery of the ring gear, side plates forming part of the ring gear, bolts extending through the side plates, sleeves mounted upon said bolts forming gear teeth, a gear wheel engaging the sleeves for rotating the ring gear, and a cutter head mounted upon the ring gear.

7. A machine of the character described having in combination, a main bearing, an annular bearing concentrically mounted in relation to the main bearing, a ring gear rotatably mounted upon the annular bearing, a cutter head rotatably mounted upon the main bearing and rigidly secured to the ring gear, and means for rotating the ring gear.

8. A machine of the character described having in combination, a main bearing, an annular bearing concentrically mounted in relation to the main bearing, a ring gear rotatably mounted upon the annular bearing, a cutter head rotatably mounted upon the main bearing, buckets rigidly secured between the ring gear and the cutter head for turning the cutter head with the ring gear, and means for rotating the ring gear.

9. A machine of the character described having in combination, a main bearing, an annular bearing concentrically mounted in relation to the main bearing, a ring gear rotatably mounted upon the annular bearing, a cutter head rotatably mounted upon the main bearing, buckets positioned between the ring gear and the cutter head and rigidly secured to the latter, said ring gear being of channel formation, bolts passing through the ring gear and the said bucket for rigidly holding the bucket upon the ring gear, and a pinion engaging the said bolts for turning the ring gear.

10. A machine of the character described having in combination, a main bearing, an annular bearing concentrically mounted in relation to the main bearing, a ring gear rotatably mounted upon the annular bearing, a cutter head rotatably mounted upon the main bearing, buckets positioned between the gear ring and the cutter head, each of said buckets having a front wall secured to the cutter head, a back wall forming part of said bucket secured to the ring gear, an end wall forming part of the bucket, said end wall of the bucket being inclined at an oblique angle between the front and rear walls of the bucket increasing the size of the bucket adjacent to the ring gear and forming a rigid brace between the ring gear and the cutter head, and means for rotating the ring gear which imparts a rotary motion to the cutter head through the said bucket.

11. A machine of the character described, having in combination, a cutter head rotatably mounted, cutters upon the forward face of the cutter head, a member pivotally mounted upon the cutter head adjacent to the periphery thereof, a cutter upon said pivoted member and means for positioning the pivoted member about its pivot point for adjusting the cutter on the pivoted member at different distances from the center of rotation of the cutter head to vary the diameter of the excavation made by the cutter head.

12. A machine of the character described, having in combination, a cutter head rotatably mounted, cutters upon the forward face of the cutter head, a rocker arm pivotally mounted upon the cutter head adjacent to the periphery thereof, a cutting blade upon one end of the rocker arm, and an adjustable member connected with the opposite end of said rocker arm and with the cutter head whereby the position of said cutting blade may be positioned at different distances from the center of rotation of the cutter head to vary the diameter of the excavation made by the cutter head.

13. A machine of the character described having in combination, a bearing, a cutter head rotatably mounted upon said bearing, a cutting blade movably mounted upon the cutter head adjacent to the periphery thereof, a connecting rod attached at one end thereof to the movable cutting blade, a centrally located member adapted to rotate with the cutter head to which the other end of said connecting rod is attached, and means for adjusting the length of the connecting rod and thus varying the diameter of the circle described by the cutting blade.

14. A machine of the character described having in combination, a bearing, a cutter head rotatably mounted upon said bearing, a rocker arm pivotally mounted upon the cutter head adjacent to the periphery thereof, a cutting blade upon one end of the rocker arm, a connecting rod attached to the opposite end of the rocker arm, a central bearing upon which the opposite end of the connecting rod is rotatably mounted, and an adjustable member forming part of the connecting rod for varying the length of the connecting rod to change position of the cutting blade on said rocker arm.

15. A machine of the character described having in combination, a bearing, a cutter head rotatably mounted upon said bearing, a rocker arm pivotally mounted upon the cutter head adjacent to the periphery thereof, a cutting blade upon one end of the rocker arm, a sleeve pivotally connected with the opposite end of the rocker arm, a rod having one end mounted in the sleeve, a sleeve mounted upon the opposite end of said rod, a centrally located member adapted to rotate with the cutter head to which said last mentioned sleeve is attached and screw threads formed upon the ends of said rod for engaging said sleeves for varying the length of the rod between the sleeves and govern the position of the cutting blade carried upon the rocker arm.

16. A machine of the character described having in combination, a bearing, a cutter head rotatably mounted upon said bearing, an arm mounted upon the cutter head adjacent to the periphery of the latter, a cutting blade having a recess formed therein of channel formation, said arm having a tongue formed thereon adapted to occupy the said recess in the cutting blade, and a fastening device for holding the cutting blade upon said tongue.

17. A machine of the character described having in combination, a bearing, a cutter head rotatably mounted upon said bearing, an arm mounted upon the cutter head adjacent to the periphery of the latter, a cutting blade having cheek pieces and a recess formed therein between said cheek pieces, a tongue upon the said arm adapted to occupy the said recess in the cutting blade, a wall forming a cutting face upon the cutting blade adapted to rest upon the said tongue, and means for securing the cutting blade upon the tongue.

18. A machine of the character described, having in combination a cutter-head rotatably mounted, a cutter mounted upon the cutter head adjacent to the periphery of the latter, a bucket rotatable with the cutter head and in a plane in the rear of the cutter, and a member having a rearwardly sloping surface mounted upon the cutter head, said member positioned adjacent to and in the same plane with the cutter for directing the dirt, as it is loosened by the cutter, rearwardly into the path of the bucket.

19. A machine of the character described, having in combination a cutter-head rotatably mounted, a rocker-arm, a cutter upon the rocker arm, a bearing upon the cutter head in which the rocker arm is pivotally mounted, said rocker arm having the portion thereof carrying the cutter projecting from the bearing towards the periphery of the cutter head, said cutter, said rocker arm and said bearing having rearwardly sloping surfaces formed thereon adapted to direct the dirt, loosened by the cutter, rearwardly from the forward face of the cutter head.

20. A machine of the character described, having in combination, a cutter head rotatably mounted, a radial arm forming part of the cutter head, a bearing plate secured to said arm, a boss upon said plate adjacent to said arm, a pivot shaft mounted in said boss and said plate, a rocker arm mounted upon said shaft, a cutter blade upon said rocker arm, a bucket positioned upon the rear of said radial arm, and said boss having a beveled surface adapted to direct the dirt loosened by the cutter blade rearwardly into the path of the bucket.

21. A machine of the character described, having in combination a cutter head rotatably mounted, a radial arm forming part of the cutter head, a bearing plate secured to said arm, a boss upon said plate adjacent to said arm, a pivot shaft mounted in said boss and said plate, a rocker arm mounted upon said shaft, a cutter blade upon said rocker arm, a bucket positioned upon the rear of said radial arm, and said rocker arm having a beveled surface thereon adapted to direct the dirt loosened by the cutting blade rearwardly into the path of the bucket.

22. A machine of the character described, having in combination a cutter head rotatably mounted, a radial arm forming part of the cutter head, a bearing plate secured to said arm, a boss upon said plate adjacent to said arm, a pivot shaft mounted in said boss and said plate, a rocker arm mounted upon said shaft, a cutter blade upon said rocker arm, a bucket positioned upon the rear of said radial arm, ribs formed upon the bucket, one of said ribs being secured to the radial arm, the other one of said ribs being secured to the said bearing plate, said rocker arm being pivotally mounted in said bearing plate, a cutting blade upon one end of the rocker arm, and a connecting rod attached to the other end of the rocker arm for operating the latter and said connecting rod occupying the space between said ribs upon the bucket and in the rear of the said bearing plate.

23. A machine of the character described having in combination, a cylindrical casing, a cutter head mounted at the forward end of the casing and adapted to be rotated concentrically in relation to the casing, a cutting blade movably mounted upon the cutter head adjacent to the periphery thereof, and means for actuating the movable cutting blade during the revolution of the cutter head whereby said movable cutting blade will describe a circle which is eccentric to the cylindrical casing.

24. A machine of the character described having in combination, a cylindrical casing, a cutter head mounted at the forward end of the casing and adapted to be rotated concentrically in relation to the casing, cutting blades movably mounted upon the cutter head adjacent to the periphery of the cutter head, connecting members attached to the diametrically opposed movable cutting members, and means for actuating the said connecting members in relation to the center of rotation of the cutter head thus governing the circle described by the movable members in relation to the casing.

25. A machine of the character described having in combination, a bearing, a cutter head rotatably mounted upon said bearing, a cutting blade movably mounted upon said cutter head, and means for extending and withdrawing the cutting blade relatively to the axis of rotation of the cutter head during each revolution of the cutter head whereby said movable cutter blade will describe a circle which is eccentric to the casing.

26. A machine of the character described having in combination, a bearing, a cutter head rotatably mounted upon said bearing, a cutting blade movably mounted upon said cutter head, means for actuating the movable cutting blade eccentrically in relation to the center of rotation of the cutter head, and means for changing the amount of eccentricity given to the movable cutting blade during the rotation of the cutter head.

27. A machine of the character described having in combination, a bearing, a cutter head rotatably mounted upon said bearing, a cutting blade movably mounted upon said cutter head, means for actuating the movable cutting blade eccentrically in relation to the center of rotation of the cutter head, and means for positioning the said eccentrically actuating means to effect the greatest eccentric throw of the said cutting blade at any predetermined radial position in the circle of rotation of the cutter head during the rotation of the cutter head.

28. A machine of the character described having in combination, a bearing, a cutter head rotatably mounted in said bearing, a rocker arm pivoted upon the cutter head adjacent to the periphery thereof, a cutting blade on one end of the rocker arm, a connecting rod attached to the opposite end of the rocker arm, and means for actuating the connecting rod as the cutter head revolves to control the position of the cutting blade carried by the said rocker arm in relation to the center of rotation of the cutter head.

29. A machine of the character described having in combination, a bearing, a cutter head rotatably mounted upon said bearing, a rocker arm pivotally mounted upon the cutter head adjacent to its periphery, a cutting blade secured upon one end of the rocker-arm, a connecting rod pivotally attached to the opposite end of the rocker arm, a member positioned adjacent to the center of rotation of the cutter-head, said connecting rod having one end thereof connected to said member, and means for changing the center of rotation of said member in relation to the center of rotation of the cutter head whereby motion will be imparted to the rocking arm and thereby increase and diminish the effective cutting radius of the cutter head at predetermined arcs of the circle described by the cutter head.

30. A machine of the character described having in combination, a bearing, a cutter head rotatably mounted at the forward end of the said bearing, cutting blades secured upon the cutter head, a cutting blade movably mounted upon the cutter head adjacent to the periphery thereof, a connecting rod attached at one end thereof to the said movable cutting blade, a member to which the inner end of said connecting rod is attached, a shaft mounted in the bearing upon which shaft the said member is rotatably mounted, and means for changing the position of said shaft in relation to the axis of rotation of the cutter head.

31. A machine of the character described having in combination, a bearing, a cutter head rotatably mounted upon said bearing, arms forming part of the cutting head, a cutting blade movably mounted upon each arm adjacent to the outer end thereof, a disk located adjacent to the center of the cutter head, a connecting rod having one end thereof rigidly attached to the disk and its other end pivotally attached to one of the movable blades whereby the disk will be rotated with the cutter head, other connecting rods pivotally attached to the disk and to the remaining movable blades, and means for varying the position of the disk in relation to the axis of rotation of the cutter head.

32. A machine of the character described having in combination, a cylindrical casing, a main bearing secured within the casing, a bearing-sleeve secured upon said bearing and located concentrically in relation to the casing, a cutter head, a hub forming part of the cutter head rotatably mounted upon the bearing-sleeve, a sleeve rotatably mounted concentrically within the bearing-sleeve, a shaft eccentrically mounted within the said sleeve, a stud-shaft eccentrically positioned upon the end of the said shaft, a disk loosely mounted upon the stud-shaft, cutting blades movably mounted upon the cutter head adjacent to the periphery thereof, a connecting rod extending between each movable cutting blade and the said disk, and means for rotating the said sleeve and the said shaft within said sleeve for changing the center of rotation of the said disk and thereby regulating the throw of the movable cutting blades.

33. A machine of the character described having in combination, a casing, a main bearing secured within the casing, a bearing sleeve mounted upon the main bearing located concentrically in relation to the casing, a hub rotatably mounted upon said bearing sleeve, a spoke secured to said hub, a rocker arm pivotally mounted upon said spoke, a cutting blade upon one end of the rocker arm positioned adjacent to the outer end of said spoke, a shaft rotatably mounted within the bearing sleeve, a connecting rod attached to the opposite end of the rocker arm, a member upon the inner end of the connecting rod engaged by the said shaft mounted in the bearing sleeve, and means for changing the position of said shaft in relation to the bearing sleeve for controlling the rocking movement of the rocker arm.

34. A machine of the character described having in combination, a main bearing, a bearing sleeve mounted in said bearing concentrically in relation to the main bearing, an annular collar upon the bearing sleeve adapted to be clamped against the forward end of the main bearing, a nut threaded upon the rear end of the bearing sleeve adapted to be screwed against the main bearing for securing the bearing sleeve in the main bearing, said bearing sleeve having a portion extending forwardly from the said annular collar, a hub rotatably mounted on the bearing sleeve, and a cutter head mounted upon said hub.

35. A machine of the character described having in combination, a main bearing, a bearing sleeve mounted in said bearing concentrically in relation to the main bearing, an annular collar upon the bearing sleeve adapted to be clamped against the forward end of the main bearing, a nut threaded upon the rear end of the bearing sleeve adapted to be screwed against the main bearing for securing the bearing sleeve in the main bearing, said bearing sleeve having a portion extending forwardly from the said annular collar, a hub rotatably mounted on the bearing sleeve, a cutter head mounted upon said hub, an adjustable cutter upon the cutter head, and a shaft extending through the bearing sleeve for actuating the adjustable cutter.

36. A machine of the character described having in combination, a main bearing, a bearing sleeve mounted in said bearing concentrically in relation to the main bearing, an annular collar upon the bearing sleeve adapted to be clamped against the forward end of the main bearing, a nut threaded upon the rear end of the bearing sleeve adapted to be screwed against the main bearing for securing the bearing sleeve in the main bearing, said bearing sleeve having a portion extending forwardly from the said annular collar, a hub rotatably mounted on the bearing sleeve, a cutter head mounted upon said hub, an adjustable cutter upon the cutter head, a sleeve rotatably mounted in the bearing sleeve, a shaft eccentrically mounted and rotatable in the sleeve, a stud-shaft positioned eccentrically on the forward end of the shaft, a member rotatably mounted upon the stud-shaft, said member being in operable connection with the adjustable cutter, and means for rotating the said sleeve and the said shaft within said sleeve independently to control the position of the adjustable cutter.

37. A machine of the character described having in combination, a casing, a main bearing within the casing, a bearing sleeve mounted upon the main bearing located concentrically in relation to the casing, a hub rotatably mounted upon said bearing sleeve, a cutter head mounted upon said hub, an adjustable cutter mounted upon the cutter head adjacent to its periphery, a sleeve rotatably mounted within said bearing-sleeve, a shaft eccentrically mounted within the said sleeve, a stud-shaft eccentrically positioned upon the forward end of the said shaft, a disk loosely mounted upon the stud-shaft, a connecting rod between the disk and the adjustable cutter, a wheel upon the rear end of the said sleeve for rotating the same, and a wheel upon the rear end of said shaft for rotating the same whereby the position of said stud-shaft may be changed in relation to the axis of rotation of the cutter head.

38. A machine of the character described having in combination, a casing, a main bearing concentrically located within the casing, a cutter head rotatably mounted at the forward end of the casing, an adjustable cutter upon the cutter head, a member in operative connection with the adjustable cutter, a shaft rotatably mounted in the main bearing adapted to control the position of said member, and means positioned at the rear end of the main bearing for rotating the said shaft for changing the position of said members in relation to the center of rotation of the cutter head.

39. A machine of the character described having in combination a casing, an annular bearing secured within the casing, a gear ring rotatably mounted upon the said bearing, buckets secured to the forward face of the gear ring, a central bearing mounted in the casing, a hub rotatably mounted upon the central bearing, arms extending from the hub to the buckets, and means for rotating the gear ring.

40. A machine of the character described having in combination a casing, an annular bearing secured within the casing, a gear ring rotatably mounted upon the said bearing, buckets secured to the forward face of the gear ring, a central bearing mounted in the casing, located in the rear of the line of the said annular bearing, a shaft mounted in the central bearing and projecting through the gear ring, a hub rotatably mounted upon said shaft, arms extending from the hub and connected with the buckets, cutters upon said arms, and means for rotating the gear ring.

41. A machine of the character described having in combination a casing, an annular bearing secured within the casing, a gear ring rotatably mounted upon the said bearing, buckets secured to the forward face of the gear ring, a central bearing mounted in the casing, a hub rotatably mounted upon the central bearing, arms upon said hub, spokes secured to said arms and to said buckets for supporting the forward end of the buckets, cutters secured upon said spokes, and means for rotating the gear ring.

42. A machine of the character described having in combination a casing, an annular bearing secured within the casing, a gear ring rotatably mounted upon the said bearing, buckets secured to the forward face of the gear ring, a central bearing mounted in the casing, a hub rotatably mounted upon the central bearing, arms upon said hub, spokes rigidly connected with the arms, said spokes formed of angle iron, said spokes secured at their outer ends with the forward wall of the buckets, cutters carried upon the forward face of the said rotatable parts, and means for rotating the gear-ring.

43. A machine of the character described having in combination a casing, an annular bearing secured within the casing, a gear ring rotatably mounted upon the said bearing, buckets secured to the forward face of the gear ring, a central bearing mounted in the casing, a hub rotatably mounted upon the central bearing, arms extending from said hub, spokes extending between said arms and the forward end of the buckets, a forwardly projecting frame secured to said arms, cutter blades mounted upon said frame, and means for rotating the gear-ring.

44. A machine of the character described having in combination a casing, an annular bearing secured within the casing, a gear-ring rotatably mounted upon the said bearing, buckets secured to the forward face of the gear ring, a central bearing mounted in the casing, a hub rotatably mounted upon the central bearing, arms upon said hub, spokes extending between said arms and the forward wall of the buckets, a forwardly projecting frame having feet adapted to be secured to said arms, cutter blades upon said frame, cutter blades secured to said arms, and means for rotating the gear-ring.

45. A machine of the character described having in combination, a cylindrical casing, a cutter head rotatably mounted within the casing, a bucket carried upon the cutter head, a lid hinged to the bucket, a latch upon the bucket for holding the lid closed, and a member secured in a fixed position in the circle of rotation of the said latch for releasing the latch from engagement with the lid and allowing the lid to swing open when the bucket is in the inverted position.

46. A machine of the character described having in combination a casing, an annular bearing secured within the casing, a gear-ring rotatably mounted upon the said bearing, a bucket secured to the forward face of the gear ring, a lid hinged upon the bucket, a latch upon said bucket adapted to hold the lid closed, and an arm secured within the casing and projecting through the gear-ring for engaging the latch and releasing the lid when the bucket is in the inverted position.

47. A machine of the character described having in combination a cylindrical casing, a cutter head rotatably mounted within the casing, a bucket carried upon the cutter head, said bucket having a rear wall, a bottom wall, a front wall, a side wall extending obliquely in relation to the rear wall, an extension plate on the rear wall extending above the line of the side wall, and a lid hinged to the side wall and adapted to rest against the said extension plate when in the closed position.

48. A machine of the character described having in combination a cylindrical casing, a bucket rotatably mounted within the casing, said bucket having vertical forward and rear walls, a bottom wall, a side wall extending at an oblique angle with the rear wall, an extension plate upon the rear wall extending above the top line of the side wall, a lid hinged to the side wall, said lid having one side edge formed at an angle and adapted to rest against the said extension plate when the lid is closed to a position forming an oblique angle with the bottom wall of the bucket, a latch upon the said extension plate for holding the lid in the closed position, and means for releasing the lid from said latch.

49. A machine of the character described having in combination a cylindrical casing, a ring gear rotatably mounted within the casing, a bucket having a rear wall secured to the front face of the ring gear, front, side and bottom walls attached to said rear wall of the bucket, said rear wall being of greater size than the said front wall, and said side wall extending obliquely in relation to the front and rear walls of the bucket whereby the greatest capacity of the bucket is adjacent to the ring gear.

50. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, and means for rotating said shaft and the said sleeve independently to change the position of the said member in relation to the center of rotation of the cutter head.

51. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentricaly mounted upon the forward end of said shaft, said member adapted to be engaged by the stud-shaft, a sleeve mounted in said bearing, said shaft being eccentrically mounted in the sleeve, a wheel upon the rear end of said shaft for rotating the same, and a wheel upon the rear end of the said sleeve for rotating the same, whereby the position of the stud-shaft may be varied in relation to the center of rotation of the cutter head by operating said wheels.

52. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a gear wheel secured upon the rear end of said sleeve, a pinion meshing with said gear wheel, a hand wheel for rotating the pinion for rotating the said sleeve, and means for rotating the said shaft independently of said sleeve.

53. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a gear wheel secured upon the rear end of said shaft, a pinion for rotating said gear wheel, a hand wheel for rotating the said pinion, and means for rotating the said sleeve independently of said shaft.

54. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a gear wheel secured upon the rear end of said shaft, an arm rotatable upon said shaft adjacent to said gear wheel, a pinion rotatably mounted upon said arm and meshing with the gear wheel, means for turning the pinion for rotating the shaft, and a fixed member for holding the arm against rotation with the shaft.

55. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a gear wheel secured upon the rear end of said shaft, an arm loosely mounted upon said shaft adjacent to said gear wheel, a pinion rotatably mounted upon said arm and meshing with the gear wheel, means for turning the pinion for rotating the shaft, said arm having a slot formed in the outer end thereof, and a pin secured upon the main bearing adapted to enter the said slot in the arm and hold the arm against rotation and allow the inner end of the arm to move with the eccentric movement of the shaft.

56. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a gear wheel secured upon the rear end of said sleeve, a gear wheel upon the rear end of said shaft, and hand wheels for turning the said gear wheels and thus rotating the said sleeve and the said shaft independently of each other.

57. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a stud-pin eccentrically positioned upon the rear end of said shaft, a gear wheel secured upon said stud-pin an arm loosely mounted upon the stud-pin adjacent to the gear wheel, a pinion loosely mounted upon the arm and meshing with the gear wheel, a fixed stop to hold the arm from rotating with the gear wheel and allowing the said arm to have a free movement with the eccentric stud-pin, and means for turning the pinion.

58. A machine of the character described having in combination, a main bearing, a bearing sleeve secured in the main bearing, a sleeve rotatably mounted within the bearing sleeve, a wheel secured to said sleeve for rotating the same, a shaft positioned eccentrically in and extending through the said sleeve, a wheel for rotating said shaft, a cutter head rotatably mounted concentrically in relation to the main bearing, an adjustable cutter upon the cutter head, and means operatively connecting the said shaft with the adjustable cutter to control the position of the latter during the revolutions of the cutter head and whereby the cutting effect of the adjustable cutter may be changed by rotating said wheels.

59. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a stud-pin eccentrically positioned upon the rear end of the said shaft, said stud-pin being in longitudinal alignment with the stud-shaft controlling the movements of the movable cutter on the cutter head, an indicator actuated by the stud-pin showing the action of the movable cutter in relation to the center of rotation of the cutter head, and means for rotating said shaft to change the action of the movable cutter.

60. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a stud-pin eccentrically positioned upon the rear end of the said shaft, said stud-pin being in longitudinal alignment with the stud-shaft upon the forward end of said shaft, an indicator controlled by the stud-pin showing the position of the stud-shaft in relation to the center of rotation of the cutter head, and means for rotating said shaft to change the position of the stud-shaft.

61. A machine of the character described having in combination, a main bearing, a cutter head rotatably mounted in relation to the main bearing, a rocker arm pivoted upon the cutter head, a cutting blade upon one end of the rocker arm positioned adjacent to the periphery of the cutting head, mechanism upon the main bearing for actuating the rocker arm as the cutter head revolves for moving the cutting blade in relation to the periphery of the cutter head at predetermined portions of the circle of rotation of the cutter head, and an indicator for showing the relation of the cutting blade in relation to the center of rotation of the cutter head.

62. A machine of the character described having in combination, a main bearing, a cutter head rotatably mounted in relation to the main bearing, a rocker arm pivoted upon the cutter head adjacent to its periphery, a cutting blade upon one end of the rocker arm, a shaft upon the main bearing adapted to be positioned eccentrically in relation to the center of rotation of the cutter head, a connecting member interposed between the said shaft and the rocker arm whereby a reverse movement will be given to the cutting blade when the said shaft is positioned eccentrically, and an indicator actuated by said shaft showing a true reading of the position of the effective operation of the cutting blade.

63. A machine of the character described having in combination, a main bearing, a cutter head rotatably mounted in relation to the main bearing, an adjustable cutter upon the cutter head located adjacent to its periphery, a shaft mounted in said main bearing, a connecting member interposed between said shaft and the adjustable cutter, means for positioning said shaft eccentrically in said bearing to increase the cutting action of the adjustable cutter at a predetermined point in the rotation of the cutter head, and an indicator actuated by said shaft adapted to show the distance the shaft is eccentrically positioned from the center of rotation of the cutter head, and the radial position of the increased cutting action of the adjustable cutter.

64. A machine of the character described having in combination, a main bearing, a cutter head rotatable in relation to the said bearing, an adjustable cutter on the cutter head, a shaft in the said bearing adapted to be positioned eccentrically in relation to the cutter head for actuating the adjustable cutter as the cutting head revolves, an indicator casing having a dial thereon, a connecting member for moving the indicator casing with the said shaft when the latter is moved eccentrically, a member secured in a fixed position adjacent to the dial through which the dial is visible, and an indicating mark upon the fixed member showing the center of rotation of the cutter head.

65. A machine of the character described having in combination, a main bearing, a cutter head rotatable in relation to the said bearing, an adjustable cutter on the cutter head, a shaft in the said bearing adapted to be positioned eccentrically in relation to the cutter head for actuating the adjustable cutter as the cutting head revolves, an indicator casing having a dial thereon, said indicator casing being connected with and adapted to follow the eccentric movements of said shaft, a bar upon which the casing is free to slide in one direction, a member carrying the said bar adapted to allow the bar and the casing to move at right angles to the direction the casing is movable on said bar, and a member forming an indicating mark secured in a fixed position adjacent to the face of the dial showing the center of rotation of the adjustable cutter.

66. A machine of the character described having in combination, a main bearing, a cutter head rotatable in relation to the said bearing, an adjustable cutter on the cutter head, a shaft in the said bearing adapted to be positioned eccentrically in relation to the cutter head for actuating the adjustable cutter as the cutting head revolves, an indicator casing having a dial thereon, said indicator casing being engaged by the said shaft and adapted to follow the eccentric movements of the shaft, arms secured in a fixed position and extending along opposite sides of the indicator casing, links pivoted to the arms, a bar pivoted to said links, a bearing upon the indicator casing slidably mounted upon said bar adapted to hold the casing against rotation, and a member forming an indicating mark secured in a fixed position adjacent to the face of the dial showing the center of rotation of the cutting head.

67. A machine of the character described having in combination, a main bearing, a cutter head rotatable in relation to the said bearing, an adjustable cutter on the cutter head, a shaft in the said bearing adapted to be positioned eccentrically in relation to the cutter head for actuating the adjustable cutter as the cutting head revolves, an indicator casing having a dial thereon, said indicator casing being engaged by and movable with said shaft, arms secured in a fixed position at either side of the indicator casing, a bearing member upon said arm for holding the casing against rotation with the shaft, a face plate upon the indicator casing having an opening formed therein through which the dial is visible; a member forming an indicating mark positioned between the face plate and the dial, and means for holding said member in a fixed position.

68. A machine of the character described having in combination, a main bearing, a cutter head rotatable in relation to the said bearing, an adjustable cutter on the cutter head, a shaft in the said bearing adapted to be positioned eccentrically in relation to the cutter head for actuating the adjustable cutter as the cutting head revolves, an indicator casing having a dial thereon, said indicator casing being engaged by and movable with said shaft, arms secured in a fixed position at either side of said indicator casing, a bearing member upon said arms for holding the indicator casing against rotation with the said shaft, said indicator casing having apertures formed therein to receive said arms, a glass plate secured upon said arms, a mark upon the glass plate showing the center of rotation of the cutter head, and a face plate upon said casing having an aperture formed therein through which the dial and the indicating mark on the glass plate are visible.

69. A machine of the character described having in combination, a main bearing, a cutter head rotatable in relation to the said bearing, an adjustable cutter on the cutter head, a shaft in the said bearing adapted to be positioned eccentrically in relation to the cutter head for actuating the adjustable cutter as the cutting head revolves, an indicator casing having a dial thereon, said indicator casing being engaged by and movable with said shaft, means for holding the indicator casing against rotation with said shaft and permitting the said casing to follow the eccentric movements of the shaft, a member forming an indicating mark showing the center of rotation of the cutter head, means for holding said member in a fixed position in relation to the dial on the indicator casing, and said dial having circles thereon indicating the distance the said shaft is positioned eccentrically, and radial lines upon the dial showing the radial position of the shaft in relation to the center of rotation of the cutter head.

70. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, an indicator casing positioned at the rear end of the shaft, a pivot member upon which the indicator casing is loosely mounted, said pivot member being located upon said shaft in longitudinal alignment with the stud-shaft on the forward end thereof, a dial formed upon the indicator casing arranged concentrically with the said pivot member, a member forming a point indicating the center of rotation of the cutter head, a bearing for holding said member forming the indicating point in a fixed position, and means for holding the indicator casing against rotation on its own center.

71. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a stud-pin eccentrically positioned upon the rear end of said shaft and in longitudinal alignment with the stud-shaft on the forward end of said shaft, said stud-shaft controlling the movement of the movable cutter on the cutter head, an indicator casing mounted at the rear end of said shaft and movable with the stud-pin, a dial formed upon the indicator casing, a face plate having an aperture formed therein through which the dial is visible, and a member secured in a fixed position between the dial and the face plate having thereon an indicating mark showing the relation of the action of the movable cutter to the center of rotation of the cutting head.

72. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a bolt secured in the rear end of said shaft in longitudinal alignment with the stud-shaft on the front end of said shaft, a disk plate loosely mounted on said bolt, an indicator shell mounted upon the disk plate, a dial formed upon the shell arranged concentrically with the bolt, a face plate upon the shell having an aperture formed therein through which the dial is visible, an arm secured in a fixed position carrying an indicating mark adjacent to the dial showing the true center of the machine, and means for holding the dial from rotating upon the bolt as a center.

73. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a bolt secured in the rear end of said shaft in longitudinal alignment with the stud-shaft on the front end of said shaft, a disk plate loosely mounted on said bolt, a box encasing the disk plate, an indicator shell secured to said box, a dial formed upon the face of said box, a face plate having an aperture formed therein in alignment with the dial, said shell having apertures formed in the sides thereof, arms secured in fixed bearings having their ends extending through said apertures in the shell, a glass plate mounted upon said arms and located between the dial and the face plate, said glass plate having a mark thereon showing the true center of the machine, and a bearing for holding the shell against rotating and allowing the shell to follow the eccentric movements of the bolt.

74. A machine of the character described having in combination, a main bearing, a cutter head rotatably mounted at the forward end of said bearing, a cutting blade movably mounted upon the cutter head adjacent to its periphery, a member in operative connection with the said cutting blade, a shaft rotatably mounted in said bearing, a stud-shaft eccentrically mounted upon the forward end of said shaft, said member adapted to be engaged by the stud-shaft, a sleeve mounted in said bearing, said shaft being eccentrically mounted in the sleeve, a wheel secured upon the sleeve at the rear end of the main bearing for turning the sleeve, a stud-pin eccentrically positioned upon the rear end of said shaft in alignment with the stud-shaft on the front end of the shaft, a wheel secured to said stud-pin, an arm loosely mounted upon said stud-pin, a pinion carried by said arm for turning the wheel secured to the stud-pin, a threaded shank concentrically positioned upon the rear end of said stud-pin, a retaining washer for holding the arm on the stud-pin, a nut threaded upon the said shank for engaging the retaining washer, a bolt concentrically positioned in the end of the said shank, an indicator shell movable with the said stud-pin, a dial on said shell, a member secured in a fixed position forming an indicating mark adjacent to the face of the dial, and means for holding the dial from rotating with the said stud pin.

75. A machine of the character described having in combination, a main bearing, an annular bearing concentrically mounted in relation to the main bearing, a ring gear rotatably mounted in the annular bearing, said main bearing having a portion extending forwardly through the ring gear, a hub rotatably mounted upon the main bearing, arms upon said hub, buckets rigidly secured to the forward face of the ring gear and to the rear face of the said arms, cutters carried upon the forward face of the said arms, a pinion engaging the ring gear, and a motor mounted in a fixed position in relation to the main bearing for rotating the said pinion.

76. A machine of the character described having in combination, a casing, an annular bearing secured in the casing, a ring gear rotatably mounted in the said annular bearing, a main bearing concentrically mounted within the casing, a hub loosely mounted upon the main bearing, arms upon said hub, cutters secured upon said arms, buckets rigidly secured between the ring gear and the outer ends of the arms upon said hub, a motor mounted within the casing, gearing between the motor and the ring gear for rotating the latter, an adjustable cutter movably mounted upon said arms, a member located adjacent to the main bearing and connected with the said adjustable cutter, a stud-shaft upon which said member is rotatably mounted, and eccentrically actuated mechanism upon the main bearing for changing the position of the stud-shaft relatively to the center of the casing to vary the cutting effect of the adjustable cutter in relation to the casing.

77. A machine of the character described having in combinaion, a casing, an annular bearing secured in the casing, a ring gear rotatably mounted in the said annular bearing, a main bearing concentrically mounted within the casing, a hub loosely mounted upon the main bearing, arms upon said hub, cutters secured upon said arms, buckets rigidly secured between the ring gear and the outer ends of the arms upon said hub, a motor mounted within the casing, gearing between the motor and the ring gear for rotating the latter, an adjustable cutter movably mounted upon said arms, a member located adjacent to the main bearing and connected with the said adjustable cutter, a stud-shaft upon which said member is rotatably mounted, eccentrically actuated mechanism upon the main bearing for changing the position of the stud shaft relatively to the center of the casing to vary the cutting effect of the adjustable cutter in relation to the casing, and an indicator for showing the eccentric cutting action of the adjustable cutter in relation to the casing.

In testimony whereof I affix my signature.

MILTON ROY SHEEN.